US008752803B2

(12) United States Patent
Goldberg et al.

(10) Patent No.: US 8,752,803 B2
(45) Date of Patent: Jun. 17, 2014

(54) STANDOFF ADAPTOR FOR PUSH PIN

(75) Inventors: Matt Goldberg, Indianapolis, IN (US); Lawrence S. Agnello, Indianapolis, IN (US)

(73) Assignee: Accurate Manufactured Products Group Inc., Indianapolis, IN (US)

(*) Notice: Subject to any disclaimer, the term of this patent is extended or adjusted under 35 U.S.C. 154(b) by 183 days.

(21) Appl. No.: 13/441,317

(22) Filed: Apr. 6, 2012

(65) Prior Publication Data

US 2013/0263432 A1 Oct. 10, 2013

(51) Int. Cl.
*A47G 1/16* (2006.01)
*G09F 7/18* (2006.01)
*F16B 15/02* (2006.01)

(52) U.S. Cl.
USPC ..................... 248/490; 29/525.01; 29/525.02; 248/201; 248/231.91; 411/384; 411/480

(58) Field of Classification Search
USPC ............. 29/525.01, 525.02, 525.11; 411/485, 411/482, 439, 480, 372.5, 384, 372.6; 24/457, 486; 248/216.1, 231.91, 316.6, 248/201, 218.3, 490, 475.1; 40/607.13
See application file for complete search history.

(56) References Cited

U.S. PATENT DOCUMENTS 1,726,532 A * 9/1929 Andel ............................. 29/277
2,192,643 A * 3/1940 Kennedy ...................... 24/710.4
2,335,957 A * 12/1943 Oliver ........................... 411/487
5,096,149 A * 3/1992 Riese ......................... 248/216.1
5,257,490 A * 11/1993 Endo et al. ...................... 52/511
D347,787 S * 6/1994 Galmines et al. .............. D8/387
5,370,487 A * 12/1994 Kracke ......................... 411/485
5,397,092 A * 3/1995 Black ............................ 248/490
5,513,935 A * 5/1996 Sharber et al. ................ 411/480
5,697,592 A * 12/1997 Matheny et al. ......... 248/231.91
D418,984 S * 1/2000 Koconis ......................... D6/314
6,158,177 A * 12/2000 Blobaum ........................ 52/208
6,443,409 B1 * 9/2002 Zanzucchi ................. 248/218.3
6,470,612 B1 * 10/2002 Pountney ................... 40/607.13
6,668,501 B2 * 12/2003 Adebar et al. .................. 52/363
6,974,290 B2 * 12/2005 Pountney ...................... 411/384
D590,704 S * 4/2009 Brunsteter ..................... D8/387
2005/0047858 A1 * 3/2005 Lin et al. ....................... 403/381
2007/0267555 A1 * 11/2007 Signor ....................... 248/218.3
2007/0286704 A1 * 12/2007 Signor ........................ 411/458
2009/0129886 A1 * 5/2009 Gelb et al. ................. 411/372.5
2010/0319166 A1 * 12/2010 Roche ............................ 24/303
2012/0134766 A1 * 5/2012 Cameron ...................... 411/439
2012/0181402 A1 * 7/2012 Putz et al. .................. 248/224.8
2013/0269170 A1 * 10/2013 Goldberg .................. 29/525.02

OTHER PUBLICATIONS

DISPLAYS2GO web page advertisment for sign mounts; aluminum sku#SO2540AL, Copyright 2013, George Patton Associates, Inc.

* cited by examiner

*Primary Examiner* — David Bryant
*Assistant Examiner* — Jun Yoo
(74) *Attorney, Agent, or Firm* — Woodard, Emhardt, Moriarty, McNett & Henry LLP

(57) ABSTRACT

A standoff adaptor for a push pin. A spacer has a hole formed in one end to complementarily receive a push pin with the pin of the push pin extending outwardly therefrom. A head is threadedly mounted to the opposite end of the spacer and may be adjusted to tightly grip an item between a spacer and head.

12 Claims, 4 Drawing Sheets

STANDOFF ADAPTOR FOR PUSH PIN

BACKGROUND OF THE INVENTION

1. Field of the Invention

The present invention relates generally to the field of standoffs used to mount an item in spaced relationship to a wall.

2. Description of the Prior Art

Push pins are used to mount notes, signs and variety of items to a bulletin board, wall or other supporting structure. Push pins come in a variety of shapes and configurations; however, they include a main body, typically plastic, having a metal pin mounted thereto and extending outwardly to pierce the wall upon which the main body of the push pin is to be mounted. The advantage of the push pin is that only a tiny hole is created in the wall for the mounting of the push pin. One limitation is that the item to be mounted must be lightweight since the item located between the push pin main body and the wall or hung on the push pin provides a downward force on the small diameter pin inserted into the wall. Another limitation is that the item to be mounted to the wall may be positioned immediately adjacent the wall and does not standoff outwardly from the wall.

Art galleries may utilize a variety of techniques for mounting labels having the artist name and title of the art next to the art hung on the wall. Many galleries use adhesive labels which may deface the wall when removed. Another technique is to use thumb tacks or push pins which does not present a professional appearance. Since the art is rotated often in galleries, these problems are magnified.

A variety of standoffs, which are used to mount signs, glass, metal, etc. to walls in a spaced relationship to the wall present a finished and professional appearance. Standoffs are mounted directly to the wall with anchors, screws, hanger bolts, etc. providing a permanent installation thereby altering the wall or surface upon which the standoff is mounted. The price of such standoffs is relatively high for art galleries or in a retail environment.

Disclosed herein is a standoff that slips over the body of a push pin allowing for a very fast and neat installation since the standoff requires only the tiny hole in the wall caused by the pin. Such standoffs may be produced at a relatively low and reasonable price.

The standoff adaptor for a push pin disclosed herein overcomes the limitations listed above. Namely, the adaptor main body surrounds the push pin increasing the load transfer surface to the wall created by the item mounted to the opposite end of the adaptor. Further, the wall or other surface upon which the push pin and adaptor are mounted do not cause any defacing of the wall or surface once they are removed.

SUMMARY OF THE INVENTION

One embodiment of the present invention is a standoff adaptor for a push pin having a main body for mounting an item to a wall. A spacer has a first end to removably receive the main body of a push pin mountable to a wall. The first end has a wall contact surface and the spacer further has a second end with a spacer contact surface. The spacer includes a longitudinal axis extending from the first end to the second end. A head is movable on the second end of the spacer. The head has a head contact surface facing the spacer contact surface and spaced therefrom a first distance. The head is adjustably movable to and from the spacer while being mounted thereto to change the distance along the axis between the head contact surface and the spacer contact surface to grip an item therebetween for mounting the item to a wall by the push pin.

It is an object of the present invention to provide a new and improved fastener for securing an item in spaced relationship to a wall.

A further object of the present invention is to provide a standoff adaptor mountable directly to a push pin.

A further object of the present invention is to provide a new and improved standoff.

Related objects and advantages of the present invention will be apparent from the following description.

DESCRIPTION OF THE PREFERRED EMBODIMENT

Figure 1:
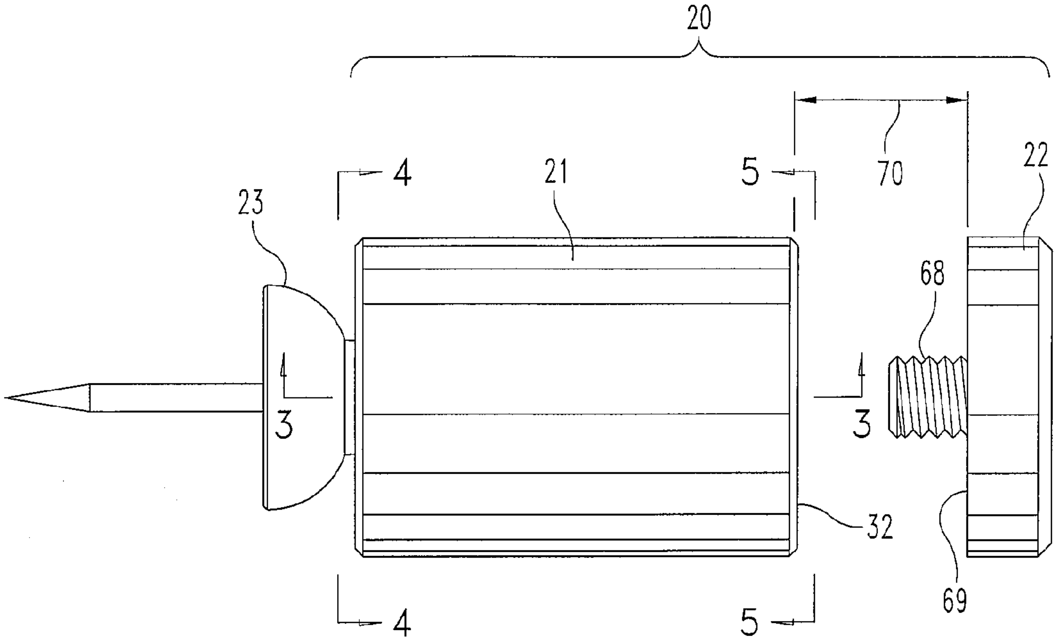
FIG. 1 is an exploded side view of a standoff adaptor being assembled to a push pin.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 shows an adaptor being assembled to a push pin. The adaptor 20 includes a main body 21 having a head 22 threadedly mountable thereto. The main body 21 of the adaptor forms a spacer and has a hole at the opposite end of the head into which a push pin 23 may be inserted.

Figure 2:
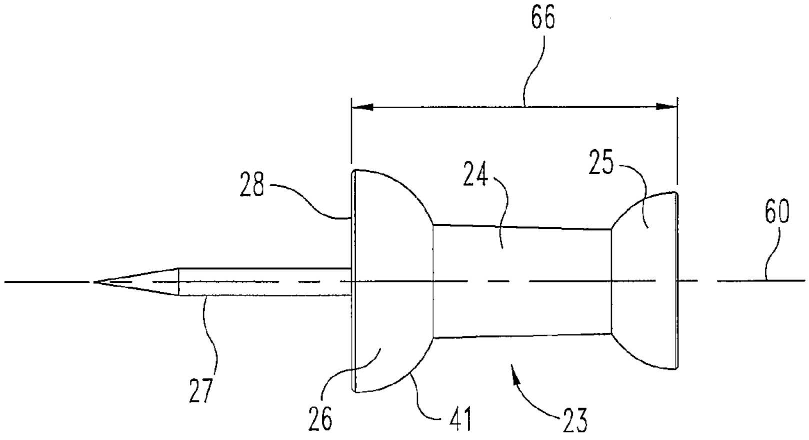
FIG. 2 is a side view of a push pin.

A commercially available push pin 23 is shown in FIG. 2 and has a main body with opposite enlarged heads 25 and 26 with the portion 24 therebetween being reduced in diameter. A pin 27 extends outwardly from the wall contact surface 28 which faces the wall or other surface to which the push pin is to be mounted. The item mounted to the push pin may either be positioned between surface 28 and the wall or surface pierced by pin 27 or the item may be hung on the reduced portion 24 located between the opposite ends 25 and 26. Typically, the push pin main body is produced from plastic whereas the pin 27 is produced from metal.

Figure 3:
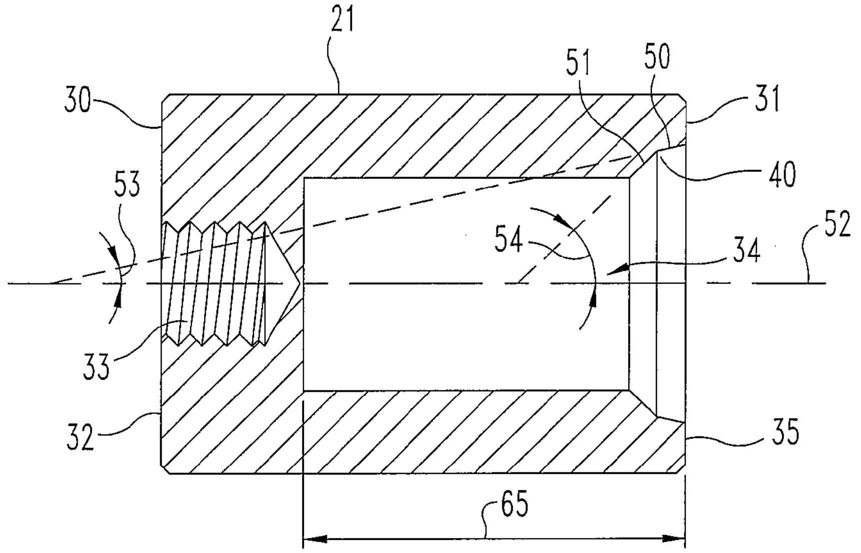
FIG. 3 is a cross-sectional view taken along the line 3-3 of FIG. 4 and viewed in the direction of the arrows.

The main body 21 (FIG. 3) of the spacer has a pair of opposite ends 30 and 31 with the main body depicted in the drawings having a cylindrical configuration. Nevertheless, it is understood that the main body of the spacer may take a variety of external configurations in lieu of cylindrical, for example, square, rectangular, oval, triangular and other polygonal shapes. End 30 has an outwardly facing contact surface 32 through which an internally threaded hole 33 extends. The opposite end 31 of the spacer main body has a wall facing surface 35 through which hole 34 extends. Hole 34 is sized to receive the main body of the push pin 23 so that surface 28 of the pin body is aligned and flush with surface 35 (FIG. 6) when the push pin is fully inserted into the adaptor main body.

Figure 4:
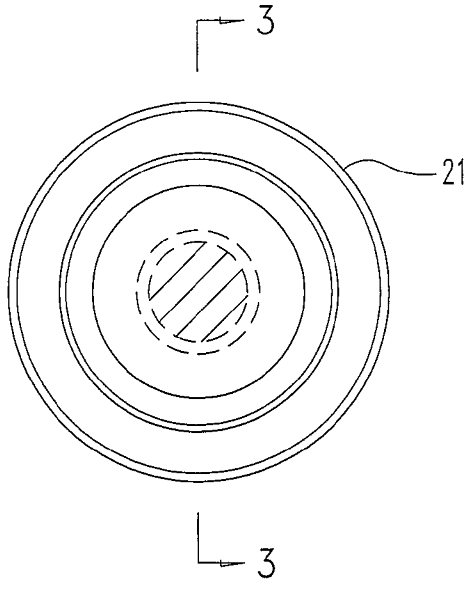
FIG. 4 is an end view of the spacer in the direction of arrows 4-4 of FIG. 1.
Figure 5:
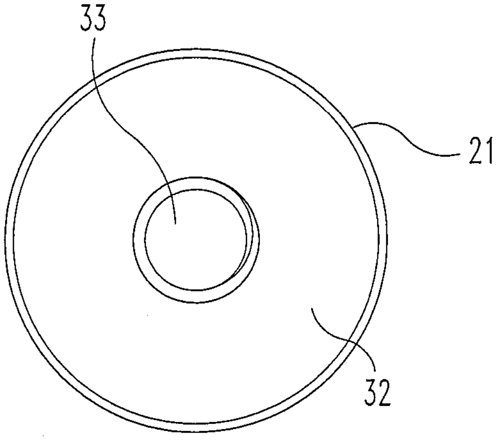
FIG. 5 is an end view of the spacer in the direction of arrows 5-5 of FIG. 1.

Hole 34 has a beveled or chamfered entrance 40 shaped to mate with the curved surface 41 (FIG. 2) of push pin end 26. In the embodiment depicted in FIGS. 3 and 4, chamfered entrance 40 includes a pair of beveled surfaces 50 and 51 arranged to mate with surface 41 (FIG. 2) of the push pin. Surfaces 50 and 51 extend continuously around the longitudinal axis 52 of the spacer main body with the axis extending centrally through the spacer between ends 30 and 31. Each surface 50 and 51 is slanted and arranged at an acute angle relative to axis 52. Beveled surface 50 extends from surface 35 of the spacer to surface 51 and is arranged at an acute angle 53 relative to the axis. Slanted surface 51 extends from surface 50 towards the outward end 30 of the spacer main body and is arranged at an acute angle 54 relative to axis 52. Surface 51 is arranged at an acute angle 54 greater than the acute angle 53. Surfaces 50 and 51 are arranged at the acute angles 54 and 53 so that the chamfered entrance 40 mates with curved surface 41 (FIG. 2). Surface 41 extends more sharply toward the longitudinal push pin axis 60 as surface 41 nears the reduced pin portion 24. That is, surface 41 extends parallel to axis 60 adjacent surface 28 and then toward perpendicular to axis 60 as it nears pin portion 24.

Figure 6:
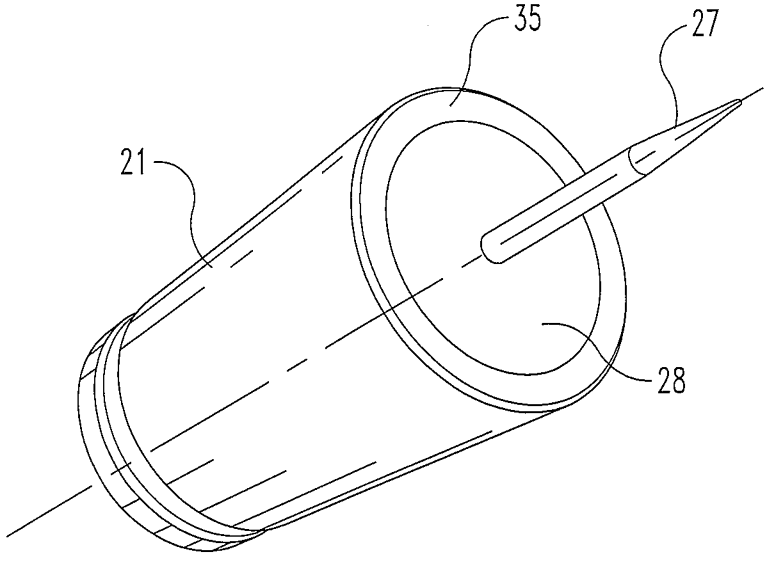
FIG. 6 is an end perspective view of the push pin being flush with the adaptor main body.

Hole 34 has a length 65 (FIG. 3) equal to the length 66 (FIG. 2) of the main body of push pin 23 (FIG. 2) so that the entire main body of the push pin may be inserted fully into the spacer main body 21 causing surfaces 41 (FIG. 2) and 40 (FIG. 3) to contact and mate with surfaces 35 and 28 then being flushed (FIG. 6). As a result, the area of surface 28 of the push pin is increased by the addition of the area of surface 35 of the spacer providing a greater load transfer surface to the wall.

The threaded hole 33 (FIG. 3) meshingly receives the externally threaded screw or bolt shaped end 68 of head 22 (FIG. 1) allowing for the distance between spacer contact surface 32 and head contact surface 69 to be changed as head 22 is rotated on spacer 21. Thus, as head 22 is rotated onto spacer 21, distance 70 between surfaces 32 and 69 may be varied depending upon the thickness of the item to be inserted therebetween. For example, if the thickness of an item to be mounted to the adaptor, it is 0.2 inches then initially head 22 is adjusted so that distance 70 is greater than 0.20 inches. The item to held is inserted between surfaces 32 and 69 with the head then being rotated decreasing distance 70 so as to eventually grip the item between surfaces 32 and 69 transferring the weight of the item being held through spacer 21 to surfaces 35 and 28 (FIG. 6) and then to the wall or surface upon which the push pin and adaptor are mounted.

The method of mounting an item in spaced relationship to a wall with the push pin and adaptor shown in FIG. 1 includes the step of providing a push pin with a push pin main body and a pin element extending outwardly therefrom, a spacer with a spacer main body with an outwardly facing spacer surface, a head with a head surface, and the item with thickness to be mounted to a wall. The push pin main body is inserted into spacer 21 with the pin element 27 then being inserted into a wall or other surface upon which the combination is to be mounted. Head 22 is then moved on spacer 21 until the head surface 69 is spaced apart a distance 70 from the main body surface 32 with distance 70 being greater than the thickness of an item to be mounted between the two surfaces. The item is then inserted between head surface 69 and spacer surface 32.

Figure 7:
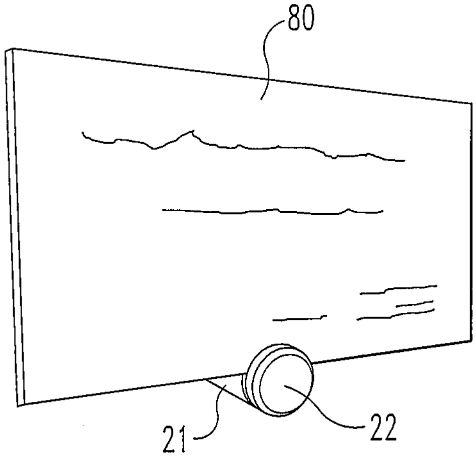
FIG. 7 is the view of a sign mounted to the head and main body of the adaptor and extending there above.
Figure 8:
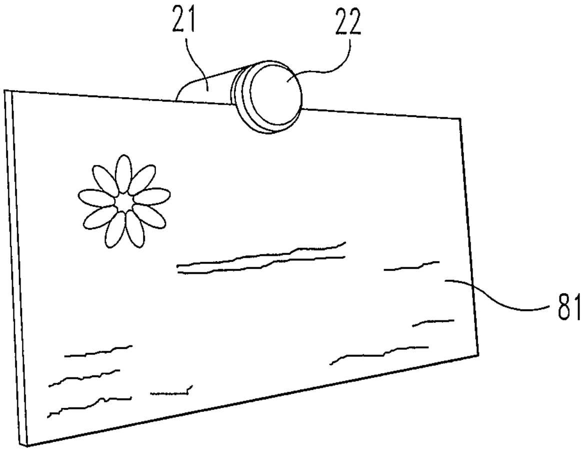
FIG. 8 is the same view as FIG. 7 only showing the sign extending below the adaptor.

Many variations are contemplated relative to how the item is to be hung. For example, in FIG. 7 is shown a sign 80 having a certain thickness inserted between the head and spacer with sign 81 extending upwardly from the adaptor. In FIG. 8, the sign 81 is still inserted between the spacer and head although the sign extends downwardly from the adaptor.

Once the item, such as, sign 80 and 81 is inserted between the head and spacer, the head on the spacer is then moved until surfaces 32 and 69 tightly grip the item positioned therebetween. Previous to the mounting of the item to be held by the spacer and head, the push pin main body is inserted into the spacer so that the spacer main body is flush with the push pin main body. As the pin 27 is inserted into the wall, the push pin and spacer are forced towards the wall until surfaces 28 of the push pin and 35 of the spacer are in contact and against the wall.

Alternatively, sign 80 and 81 may include, respectively, a hole at the bottom edge portion and top edge portion. Head 22 may be slipped through the hole with the sign being moved to be positioned between the head and spacer. Head 22 is then tightened thereby gripping the sign between the head and spacer.

Many variations are contemplated and included in the present invention. For example, the beveled entrance 40 is shown as having two beveled surfaces 50 and 51 that are essentially flat and arranged at acute angles with the first beveled surface 50 being at an acute angle less than the acute angle formed by surface 51 and longitudinal axis 52. The opposite is contemplated and included in the present invention. For example, surfaces 50 and 51 may be arranged so that angle 53 is greater than angle 54. Likewise, surfaces 50 and 51 may be arranged to be at the same angle with respect to the longitudinal axis thereby forming one flat surface extending around the longitudinal axis at an acute angle. Further, the beveled entrance to the hole 34 may be curved with the understanding that the goal is to mate surface 41 with respect to surfaces 50 and 51 depending upon the particular shape and configuration of the pin head surface 41. More specifically, the chamfered entrance 40 is configured to allow the push pin to fit tightly into the spacer so that surfaces 28 and 35 (FIG. 6) will sit flush on the wall.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A standoff adaptor for a push pin having a main body with a first end portion, an opposite second end portion, said push pin further having a pin connected to said main body and extending outwardly from said second end portion for mounting an item to a wall comprising:

a spacer having a first end to removably receive the first end portion of a main body of a push pin mountable to a wall, said first end of said spacer having a wall contact surface, said spacer further having a second end with a spacer contact surface, said spacer including a longitudinal axis extending from said first end to said second end; and, a head movable on said second end of said spacer, said head having a head contact surface facing said spacer contact surface and spaced therefrom a first distance, said head adjustably movable to and from said spacer while being mounted thereto to change said distance along said axis between said head contact surface and said spacer contact surface to grip an item therebetween for mounting the item to a wall by the push pin, and wherein:

said first end of said spacer has a hole with a first diameter which extends through said wall contact surface with said spacer having a chamfered entrance to said hole to mate with the main body of the push pin when the main body is pushed into said hole, said chamfered entrance includes a first slanted surface arranged at a first acute angle relative to said axis and a second slanted surfaced arranged at a second acute angle relative to said axis greater than said first acute angle, said first slanted surface extends around said axis from said wall contact surface to said second slanted surface, said second slanted surface extends around said axis from said first slanted surface toward said second end.

2. The adapter of claim 1 wherein:

said hole of said spacer has length to receive the entire main body of the push pin with said wall contact surface of said spacer being flush with the main body of the push pin forming a first load transfer surface surrounding said hole to transfer load from said spacer and head holding the item to the wall.

3. The adapter of claim 2 wherein:

said spacer has an internally threaded hole at said second end and said head includes an externally threaded portion meshingly engageable with said internally threaded hole to allow said head to be rotated changing said distance to hold an item between said spacer and head.

4. The combination of a push pin and a standoff adapter for mounting an item to a wall comprising:

a push pin having a main body with a proximal end and a distal end, said proximal end having a first outwardly facing surface with a pin member extending outwardly from said surface to extend into a wall and mount an item thereto; and, a standoff adapter including a spacer and a head mounted thereto; and wherein:

said spacer having a first end with a second outwardly facing surface and a hole extending there through to removably receive said main body of said push pin and further having a second end with a spacer contact surface to receive said head, said spacer including a longitudinal axis extending from said first end to said second end; and, said head adjustably mounted to said second end of said spacer, said head having a head contact surface facing said spacer contact surface and spaced therefrom a first distance, said head adjustably movable to and from said spacer while being mounted thereto to change said distance along said axis between said head contact surface and said spacer contact surface to grip an item therebetween for mounting an item to a wall by the push pin, said main body of said push pin has an inclined surface extending from said first outwardly facing surface towards said distal end; and, said spacer having a chamfered entrance to said hole to mate with said inclined surface when the main body is forced into said hole.

5. The combination of claim 4 wherein:

said second outwardly facing surface of said spacer is flush with said first outwardly facing surface of said push pin when said main body is inserted completely into said spacer, said second outwardly facing surface of said spacer plus said first outwardly facing surface of said push pin form a load bearing surface transferring the load from an item held by said spacer and said head to the wall.

6. The combination of claim 5 wherein:

said chamfered entrance of said spacer includes a first slanted surface arranged at a first acute angle relative to said axis and a second slanted surfaced arranged at a second acute angle relative to said axis greater than said first acute angle, said first slanted surface extends around said axis from said second outwardly facing surface to said second slanted surface, said second slanted surface extends around said axis from said first slanted surface toward said second end.

7. The combination of claim 6 wherein:

said spacer has an internally threaded hole at said second end and said head includes an externally threaded portion meshingly engageable with said internally threaded hole to allow said head to be rotated changing said distance to hold an item between said spacer and head.

8. The combination of claim 7 wherein:

said hole has a hole length and said push pin has a main body length equal to said hole length.

9. A standoff adaptor for a push pin having a main body with a first end portion, an opposite second end portion, said push pin further having a pin connected to said main body and extending outwardly from said second end portion for mounting an item to a wall comprising:

a spacer having a first end to removably receive the first end portion of the main body of the push pin mountable to a wall, said first end of said spacer having a wall contact surface, said spacer further having a second end with a spacer contact surface, said spacer including a longitudinal axis extending from said first end to said second end; and, a head movable on said second end of said spacer, said head having a head contact surface facing said spacer contact surface and spaced therefrom a first distance, said head adjustably movable to and from said spacer while being mounted thereto to change said distance along said axis between said head contact surface and said spacer contact surface to grip an item therebetween for mounting the item to the wall by the push pin, and wherein:

said first end of said spacer has a hole with a first diameter which extends through said wall contact surface with said spacer having a chamfered entrance to said hole to mate with the main body of the push pin when the main body is pushed into said hole, said chamfered entrance includes a first slanted surface arranged at a first acute angle relative to said axis and a second slanted surfaced arranged at a second acute angle relative to said axis greater than said first acute angle, said first slanted surface extends around said axis from said wall contact surface to said second slanted surface, said second slanted surface extends around said axis from said first slanted surface toward said second end.

10. A standoff adapter for holding an item on a push pin comprising:

a spacer with a first end having a hole for a push pin to be inserted therein and a second end for holding an item; and, a head adjustably mounted to said second end being movably to adjust the distance between said second end of said spacer and the head for gripping an item therebetween, said head is threadly mounted to said second eiid of said spacer with said head and said spacer having mutually facing surfaces positioned apart a distance that is changeable as said head is rotated on said spacer to releasably hold an item therebetween; and, said spacer at said first end has a beveled entrance to said hole to mate with a push pin inserted therein.

11. A standoff adapter for holding an item on a push pin mountable to a wall with said push pin having a push pin main body and a pin extending outwardly from said main body comprising:

a spacer with a first end having a hole for a push pin main body to be inserted therein and with said spacer having a second end for holding an item, said spacer having an axis extending from said first end to said second end, said spacer at said first end having a slanted entrance to said hole surrounding said axis and arranged to mate with said push pin main body positioning said push pin main body therein with said pin extending outwardly therefrom; and, a head adjustably mounted to said second end being movably to adjust the distance between said second end of said spacer and the head for gripping an item therebetween.

12. The adapter of claim 11 wherein:

said push pin main body has first outwardly facing surface and said spacer has a second outwardly facing surface upon which said slanted entrance is located, said second outwardly facing surface of said spacer is flush with said first outwardly facing surface of said push pin when inserted in said hole so both said first outwardly facing surface and said second outwardly facing surface provide a combined load transfer surface when positioned against a wall.

* * * * *